3,232,860
ELECTRIC TREATER
Logan C. Waterman, Houston, Tex., assignor to Petrolite Corporation, Wilmington, Del., a corporation of Delaware
Filed Feb. 19, 1962, Ser. No. 174,065
10 Claims. (Cl. 204—306)

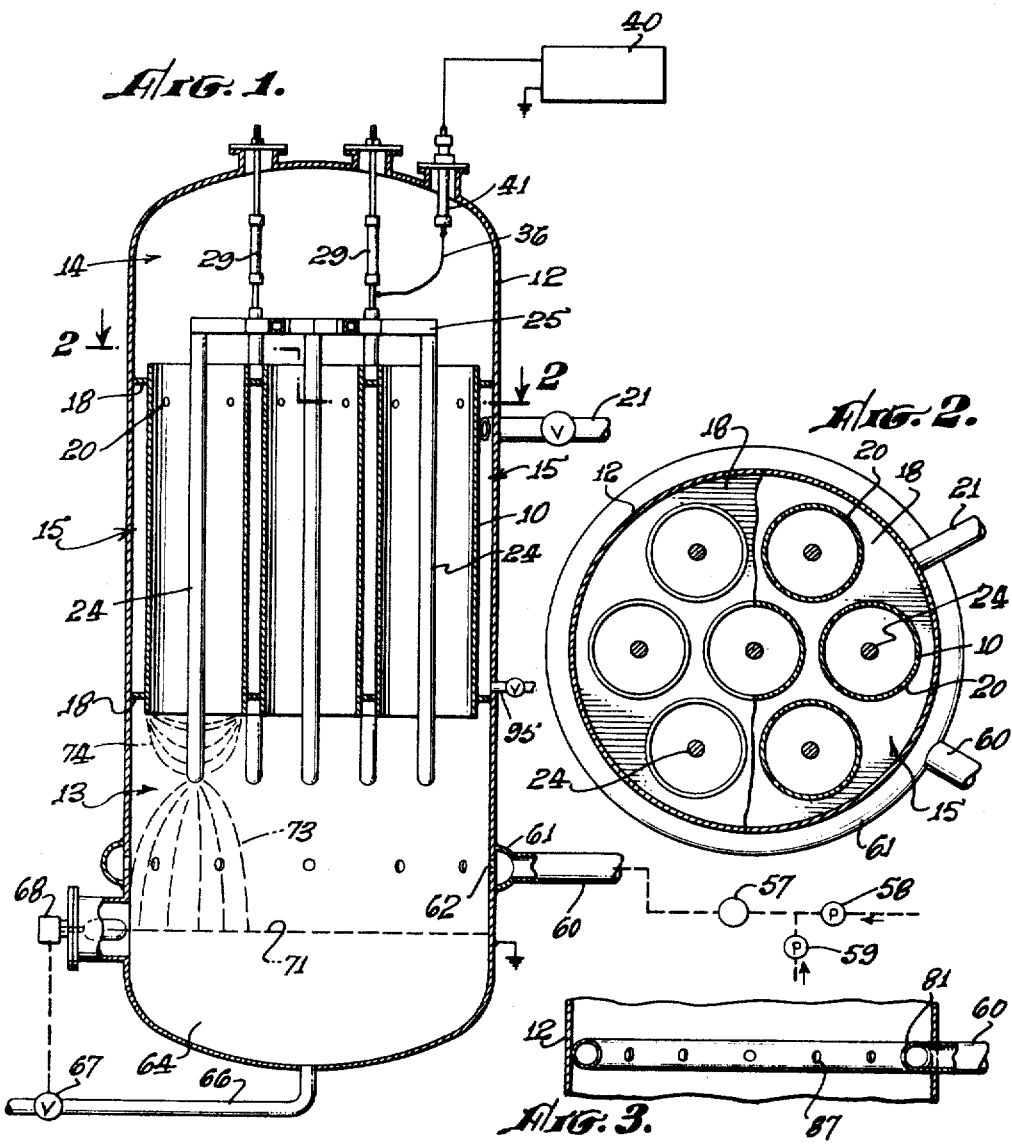

This invention relates to the electrical resolution of oil-continuous dispersions of the type in which the continuous phase may be any hydrocarbon, often a petroleum distillate, the dispersed phase including small particles sufficiently immiscible with the oil of the continuous phase to exist therein as small masses. The dispersed phase may be liquid or semi-liquid and may be composed in part of solids and will usually be of a material of higher electrical conductivity than the oil of the continuous phase. The material of the dispersed phase is commonly aqueous and may be acidic or alkaline. In many instances it represents reaction products resulting from the reaction of a reagent with certain components of the oil.

It has been proposed to treat such dispersions by subjection to high-voltage electric fields during advancement along a series of long and narrow cells disposed side by side, each cell having a central electrode structure. The invention provides an improved process wherein a stream of the dispersion enters each cell at an entrance position and a stream of the treated oil leaves each cell at an exit position, one of such streams, usually the stream of treated oil, flowing through one or more metering orifices of each cell.

It is another feature of the invention to make the metering orifices rather small with relation to the volume of the fluid passing therethrough to throttle such fluid and build up a pressure drop across each orifice. By such an arrangement it is possible to equalize the flows in the several cells. It is an object of the invention to provide an improved process and apparatus operating in these ways.

Any severe throttling of a stream containing dispersed particulate matter tends additionally to mix the constituents and make more difficult the desired separation thereof. It has heretofore been proposed to introduce the dispersion to be treated into the cells, or into an entrance zone of a container communicating with the cells, by use of a large number of small orifices often corresponding in number to the number of cells. This results in a significant pressure drop across each of such small orifices if streams of equal volume are to issue therefrom. However these pressure drops result in additional mixing of the constituents of the dispersion interfering with the rapid separation desired. It is an object of the invention to transfer to the treated oil any pressure drops desirable to insure equal flows in the cells. A pressure drop at this point is not disadvantageous as there is little or none of the dispersed particles remaining in the treated oil and there is no problem of interfering with later separation of a dispersed material.

A further feature and object of the invention resides in spacing the cells to provide an intercell space which is put to a useful purpose, as for example receiving the treated oil from metering orifices or supplying the dispersion thereto. In either instance the liquid in the intercell space thermally blankets the liquid undergoing treatment within the cells and tends to equalize the temperature in the cells and in peripheral portions of each cell. The intercell space can also be used as a separating space, a soaking space or a space in which chemical reactions can continue between an acidic or alkaline dispersed phase and some component of the oil.

A further object and advantage is to induce an auxiliary treating field from the lower ends of the electrodes of the cells to a body of separated dispersed material.

Referring to the drawing:
FIG. 1 is a vertical sectional view of one form of electric treater of the invention;
FIG. 2 is a transverse sectional view taken along the line 2—2 of FIG. 1;
FIG. 3 is a fragmentary view illustrating a modified dispersion inlet structure; and
FIGS. 4, 5 and 6 are fragmentary views illustrating alternative shapes for the lower ends of the central electrodes.

The treater illustrated in FIGS. 1 and 2 includes a plurality of tubular cells 10 useful in any environment but shown within and electrically connected to a container 12. The cells are shown as circular in cross-section but can be of any other cross-sectional shape. This container may be cylindrical or of other shape with its main axis upright or horizontal. It is exemplified as an upright cylinder with the cells grouped around its central upright axis.

A first or entrance zone 13 exists at one end of the cells and a second or entrapment zone 14 at the other end. A third or intercell space or zone 15 exists around the cells. The intertube space 15 exists throughout that portion of the cross-section of the container 12 not occupied by the tubular cells 10 and is bounded by headers 18 sealed to the container and to the tubular cells 10. One or more small holes is drilled through the side walls of each cell, forming metering orifices 20 interconnecting the intercell space 15 and the interiors of the cells. In the preferred embodiment, the upper end of the container 12 is closed, forcing the treated oil from the cells to pass through the metering orifices 20 into the intercell space acting as an exit zone. A valved pipe 21 normally withdraws the treated oil. In the illustrated embodiment the dispersion enters the cells at the open lower ends which communicate with the entrance zone 13.

An energized central electrode structure is disposed in each cell, illustrated as an elongated or rod electrode 24 with its lower end protruding from the end thereof. The upper ends of these electrodes are joined to a foraminous electrode-supporting structure 25 which supports the electrodes in depending relationship. The foraminous structure is in turn supported by insulators 29 in the zone 14. Energization of the foraminous structure 25 and the electrodes 24 is through a conductor 36 connected to the high-voltage terminal of a high-voltage source 40, usually a power pack delivering a high-voltage unidirectional potential from an alternating current supply. One terminal of this source is grounded as shown, as is also the container 12. An inlet bushing 41 carries the conductor from the container 12.

The dispersion to be treated may be pumped from storage or may be the result of mixing in a mixer 57 oil from a pump 58 and water or reagent from a pump 59. The reagent may be an acid or an alkali solution reactive with some component of the oil to form reaction products which constitute the dispersed phase of the dispersion, often with some of the reagent also present if the reaction has not been complete.

This or some other dispersion is pumped through a supply pipe 60 to a circular manifold 61 shown in FIG. 1 as surrounding the exterior of the container and sealed thereto. From the interior of the manifold 61 the dispersion flows through a limited number of orifices 62 in the container 12 of sufficient size to create only a small pressure drop across each orifice. Some of the dispersed material will settle from the incoming dispersion to form a body 64 of the separated material in the bottom of the zone 13 of the container from which separated material is withdrawn through a pipe 66 having a valve 67. The valve may be connected to any suitable level control system 68 responsive to the position of the surface or interfacial zone 71 to maintain the latter constant.

The dispersion is subjected to a preliminary electric treatment in an auxiliary electric field established in the zone 13 before entering the main treating fields established in the annular spaces of the cells 10 around the electrodes 24 thereof. With the treater illustrated, this auxiliary electric field is established in a treating space between the rounded lower ends of the electrodes 24 and the surface or interfacial zone 71. The auxiliary electric field tends to concentrate at the ends of the electrodes 24, each electrode end forming a lower field pattern indicated by dotted lines 73, this portion of the field being between the electrode end and the conductive separated body 64. The intensity of this field can be controlled by raising or lowering the surface or interfacial zone 71. An upper portion of the auxiliary field is between the lower end of each electrode 24 and the lower edge of its corresponding cell, the pattern being suggested by the dotted lines 74. Various field patterns can be established depending upon whether the lower ends of the electrodes 24 are rounded (FIG. 1), flat (FIG. 4), pointed (FIG. 5) or bulbous (FIG. 6). The configurations of FIGS. 4 and 5 will tend to concentrate the auxiliary field at the edge or point of the electrode 24 while the bulbous form of FIG. 6 will tend to reduce the degree of concentration adjacent the electrode end.

FIG. 3 illustrates an alternative distributor for the incoming dispersion. It includes a circular pipe 81 inside the container near the periphery thereof. A limited number of orifices 87 introduce the dispersion into the preliminary field and are of sufficiently large diameter so that they will not mix the incoming dispersion to an extent interfering with its separation.

It is desirable that the pressure drop across each metering orifice 20 be much higher than any small pressure drop in the orifices 62 or 87. Typically if one metering orifice is employed for each cell its diameter will be in the neighborhood of about .25–.75 inch for large throughput treaters. If more than one metering orifice is employed for each cell, as is desirable to equalize the flow at positions around each electrode 24, each orifice will be of smaller size. When metering the treated oil leaving each cell it is desirable that a pressure drop of about 2–24 oz./sq. (about 9–105 gms./sq. cm.) be induced across each metering orifice. In most instances the pressure drop will be about 3–10 oz./sq. in. (about 13–44 gms./sq. cm.). It is desirable to select the lowest pressure drop that will give the desired equalization of flow in the several cells.

After treatment in the preliminary electric field with consequent coalescence and separation of some of the dispersed material, the remaining dispersion rises along the treating spaces within the cells. When using high-voltage unidirectional electric fields the treating action in the cells is the result of a combined coalescing and electrophoretic action. The cells are desirably made sufficiently long so that most of the coalescence of the existing dispersed particles takes place in lower portions of the cellular treating spaces. The action in the uppermost portions of such treating spaces is predominantly an electrophoretic action moving residual and minute particles toward one or the other of the electrodes formed by the cell walls and the central electrodes. Coalesced or electrophoresced material settles to the body 64.

If sufficient dispersed material has separated below the cells the dispersion entering the cells will contain less than about .5% dispersed material, as is desirable. The treated oil issuing from the metering orifices 20 will usually contain no more than a few thousandths of a percent residual dispersed material when treating petroleum distillates, sometimes as low as .0001% (1 p.p.m.) but usually in the range of .0002–.001% (2–10 p.p.m.). There will be little or no separation of dispersed material from the oil in the exit chamber formed by the intercell space 15 but should any settling take place the separated material can be withdrawn periodically through a valved pipe 95.

In treating some dispersions the metering orifices may serve an additional function, namely reducing the pressure sufficiently to flash vapors from the oil in the intercell space 15. For example if the pressure drop across the metering orifices 20 is increased to .5–5 atmospheres vapors will flash from the treated oil and separate therefrom in the intercell space, the vapors being removed through the pipe 21 and the remaining oil through the pipe 95. Dissolved water or lighter fractions of the oil can thus be separated as vapors. Butane, propane, etc. can thus be separated. The degree of vaporization can be increased by increasing the pressure or temperature of the oil entering the treater or by decreasing the pressure in the intercell space as by maintaining a vacuum therein.

The preferred flow pattern of the dispersion is in accordance with the above description. However it is sometimes possible to reverse the flow with cellular treaters of this or related types. In this instance the incoming dispersion from the pump 57 would be delivered to the pipe 21 and initial separation would take place in the intercell space 15, the separated material being withdrawn through the valved pipe 95. The remaining dispersion will then be introduced into the cells through the metering orifices 20, which in this instance can be made somewhat larger and which should be arranged in a circular pattern around the periphery of each cell. Because the top of the container 12 is closed, this dispersion will be forced to flow downwardly in the cells. The coalesced or electrophoresced particles will then flow concurrently with the oil flow and will separate therefrom in the lower zone 13, the treated oil being removed through the pipe 60 and the separated dispersed material through the pipe 66. This mode of operation is desirable only when the dispersion entering the cells contains only a very small portion of dispersed material, substantially less than .5%, usually less than .1%.

Best results will be obtained if the invention is constructed and used in accordance with the following principles, although the invention is not limited thereto as some features thereof can be used in treaters of quite different design. The treating spaces around the energized central electrodes should desirably have a large length-to-gap ratio. The treater of FIG. 1 is foreshortened in this respect and its cells 10 will usually be substantially longer than suggested. The length-to-gap ratio will desirably be in the range of about 12:1–25:1 in commercial treaters but can be in the range of about 8:1–30:1 or more. Cell widths are usually in the range of about 2–16 inches (about 5–40.6 cm.) but seldom more. The central electrodes may range in diameter from about .25 inch. (about 6.3 mm.) to a large fraction of the cell width. The most desirable voltage gradients in the main treating spaces within the cells will usually be about 6–30 kv./inch (about 2.36–14.2 kv./cm.). The rate of flow of the dispersion in the main treating spaces may be about 10"/min. or higher (about 25.4 cm./in. or higher) for dispersions of heavier oils such as crude oil, but with lighter oils such as light petroleum distillates it may be up to about 50"/min. (about 128 cm./min.). Lower rates can of course be used if high throughput is not essential. Likewise one can depart from the ratios, electrode widths and gradients suggested above if less perfect results can be tolerated.

In a typical operation of a treater of the type described, a large stream (10,000 barrels/day or more) of petroleum distillate such as kerosene, heater oil, virgin gas oil, etc. can be treated at ambient temperature with a strong acid e.g. sulfuric acid of a strength of 90–98%) to remove sulfur, sulfur compounds or other acid-reactable components of the distillate. Cells of a width of about 10 inches and a length of 8 feet, used with central electrodes of a diameter of 3 inches and with unidirectional voltage gradients of about 15 kv./in. in the cellular treating spaces will produce treated oils containing less than .002% residual dispersed material. Such acid-treated oils can be subsequently mixed with an alkaline solution (e.g. about 5 to 15% of an aqueous sodium hydroxide solution of a strength of about 3% by volume), the mixture of resulting dispersion being then resolved in similar equipment. The treated oil will contain less than .003% residual dispersed material. This residual material can be further reduced by a subsequent water wash step in which about 4–8% of water is mixed therewith, the dispersion being delivered to a similar electric treater to produce an effluent treated oil containing only a few parts per million of dispersed water.

I claim:
1. An electric treater for electrically resolving oil-continuous dispersions to separate the dispersed-phase material thereof, said treater including in combination:
   a closed container having an upright flow axis, said container providing a large-volume entrance zone and a large-volume exit zone;
   a horizontal upper header below the top of said container forming a space in the upper interior of said container above said upper header;
   a horizontal lower header above the bottom of said container forming within the container below said lower header said entrance zone and a lowermost zone adapted to collect a body of separated dispersed-phase material, said upper and lower headers respectively providing upper and lower cell openings with the upper cell openings vertically aligned with the lower cell openings, the openings in each header being spaced from each other and disposed in corresponding patterns;
   a plurality of long and narrow upright cells mounted within and electrically connected to said container with their axes parallel to said flow axis and to each other, each cell having a cell wall pressurally separating the interior of the cell from said exit zone, each cell having a lower entrance portion and an upper exit portion spaced from each other substantially the axial length of the cell, the entrance portions of said cells opening on said entrance zone;
   a plurality of upright central electrodes extending axially of said cells forming interelectrode treating spaces between the central electrodes and the cell walls of the respective cells,
   each cell being of a width of about 2–16 inches, the length-to-gap ratio in each interelectrode treating space being at least in the range of 8:1–30:1;
   means for establishing a high-voltage unidirectional electric field in each of said interelectrode treating spaces;
   a relatively large orifice means opening on said entrance zone at a position removed from said entrance portions of said cells;
   means for delivering the dispersion under pressure to said relatively large orifice means to discharge into said entrance zone with only a small pressure drop during flow through such relatively large orifice means;
   means for equalizing the flow of dispersion from said entrance zone into and upwardly along said plurality of cells and said interelectrode treating spaces thereof, said last named means including a relatively large number of relatively small metering orifices in said cell walls near but below said upper header interconnecting said interelectrode treating spaces and said exit zone, said metering orifices forming with said interelectrode treating spaces the sole communication between said entrance zone and said exit zone, there being at least one of said metering orifices for each cell extending through its cell wall and opening on said exit zone, said high-voltage unidirectional electric field in each interelectrode treating space treating the dispersion therein to separate dispersed phase material therefrom and produce a treated oil, said relatively small metering orifices conducting said treated oil from the upper portions of said cells to said exit zone and being of sufficiently small size to induce on the treated oil a presssure drop substantially higher than said small pressure drop across said relatively large orifice means;
   means for withdrawing from said exit zone the treated oil entering same through said metering orifices; and
   means for withdrawing from said lowermost zone of said container the dispersed-phase material separating from said dispersion in said entrance zone and said interelectrode treating spaces.

2. An electric treater as defined in claim 1 in which said dispersion delivery means includes means for delivering said dispersion to said entrance zone at such rate as to induce across each of said metering orifices a pressure drop of about 2–24 oz./sq. in.

3. An electric treater as defined in claim 1 in which each of said metering orifices extends laterally through the cell wall of a corresponding cell and has an axis in a plane at right angles to said flow axis.

4. An electric treater for electrically resolving oil-continuous dispersions to separate the dispersed-phase material thereof, said treater including in combination:
   a closed container having an upright flow axis;
   upper and lower header means transverse to said flow axis and providing a plurality of cell openings, said header means being otherwise impervious, the openings of each header means being spaced from each other in corresponding patterns;
   a plurality of long and narrow tubular cells having ends respectively secured to said header means respectively coaxial with said cell openings thereof, the axes of said long and narrow tubular cells being parallel to said flow axis and to each other, each cell having tubular cell walls, each cell having an entrance portion and an exit portion spaced from each other substantially the axial length of the cell, there being an intercell space within said container around and between said tubular cells and bounded by said header means;
   at least one small restricted orifice in the cell wall of each cell immediately below said upper header means interconnecting the interior of said cell and said intercell space;
   a plurality of elongated central electrodes;
   means for mounting said central electrodes to extend respectively along the axes of said cells to form interelectrode treating spaces between each central electrode and the cell walls of the corresponding cell;
   means for establishing a high-voltage unidirectional electric field in each of said interelectrode treating spaces;

an inlet pipe supplying the dispersion to said container;

an outlet pipe withdrawing treated oil from said container, one of said pipes opening on said intercell space and communicating with the interiors of all of said cells at corresponding upper ends thereof through said restricted orifices, the other of said pipes communicating with the other ends of said interelectrode spaces; and means communicating with the lower interior of said container withdrawing separated dispersed-phase material therefrom.

5. An electric treater as defined in claim 4 in which the upper end of each tubular cell connected to said upper header means opens on an entrapment zone in the upper end of said container above said upper header means, said entrapment zone being otherwise free of ingress and egress means, each of said cells opening on said entrapment zone.

6. A treater as defined in claim 5 in which said field-establishing means includes an electrode-supporting structure in said entrapment zone structurally and electrically connecting said central electrodes, means for electrically insulating said electrode-supporting structure from said container, and means extending through said container connected to said electrode-supporting structure to electrically energize same and the central electrode supported thereby.

7. An electric treater as defined in claim 4 in which said intercell space is of a vertical height substantially coextensive with the vertical height of said tubular cells and constitutes a settling space in which some of the dispersed material gravitationally settles, and including an effluent pipe communicating with the lower interior of said settling space for withdrawing separated dispersed-phase material therefrom.

8. An electric treater for electrically resolving oil-continuous dispersions to separate the dispersed-phase material thereof, said treater including in combination:

upper and lower headers respectively providing upper and lower cell openings that are vertically aligned, the openings in each header being spaced from each other and disposed in corresponding patterns;

a plurality of thin-walled long and narrow upright tubular cells having their upper and lower ends respectively attached to said upper and lower headers in fluid tight relation and coaxial with the respective upper and lower cell openings thereof, said upright tubular cells having outer peripheral cell surfaces spaced from each other and inner cell surfaces facing the respective central axes of said cells, each cell having an entrance portion and an exit portion spaced from each other substantially the axial length of the cells;

a plurality of vertical smooth-surfaced rod electrodes extending axially of said cells forming interelectrode treating spaces between the rod electrodes and the inner cell surfaces of the respective cells;

means for establishing a high-voltage unidirectional electric field in each of said interelectrode treating spaces;

means for thermally blanketing said cells and for equalizing the temperature in each of the cells, in peripheral portions of each cell and interiorly and externally of each cell, said thermal blanketing means including walls enclosing said tubular cells as a group forming a temperature-equalizing space around and between said cells, said thermal blanketing means including means for flowing the dispersion successively through said temperature-equalizing space and said interelectrode treating spaces irrespective of order, the walls of said cells being thin to effect heat transfer between the components of said dispersion in said interelectrode treating spaces and in said temperature-equalizing space therearound, said means for flowing said dispersion including orifices in said tubular cells below said upper header interconnecting said interelectrode treating spaces and said temperature-equalizing space; and means for collecting and removing dispersed-phase material separating from said dispersion.

9. An electric treater for electrically resolving oil-continuous dispersions to separate the dispersed-phase material thereof, said treater including in combination:

a closed container having an upright flow axis;

a horizontal upper header below the top of said container forming in the upper interior of said container an entrapment zone;

a horizontal lower header above the bottom of said container forming within the container below said lower header an entrance zone and a lowermost zone adapted to collect a body of separated dispersed-phase material, said upper and lower headers respectively providing vertically aligned upper and lower cell openings, the openings in each header being spaced from each other and disposed in corresponding patterns;

a plurality of thin-walled long and narrow tubular cells having their upper and lower ends respectively attached to said upper and lower headers in fluid-tight relation and coaxial with the respective upper and lower openings thereof, said upper and lower ends respectively opening on said entrapment space and said entrance zone, the entrapment zone being otherwise free of means for egress or ingress of said dispersion or any constituent thereof, the space within said container between said upper and lower headers around and between said tubular cells constituting a settling space;

an electrode-supporting structure in said entrapment zone and means for insulating same from said container;

rod electrodes carried by said electrode-supporting structure and respectively depending centrally in said cells, each rod electrode forming with the inner surface of the corresponding cell an interelectrode treating space having a length-to-gap ratio at least in the range of about 8:1–30:1, the transverse width of each cell being about 2–16 inches, the transverse dimension of each rod electrode being in the range of about .25 inch up to a large fraction of the cell width, there being at least one opening in each cell wall immediately below said upper header interconnecting said interelectrode treating space of this cell and said settling space;

means for establishing a high-voltage unidirectional electric field in each of said interelectrode treating spaces;

upper and lower effluent pipes opening on the upper and lower portions of said settling space;

a dispersion inlet means introducing the dispersion to be treated into said entrance zone; and an effluent pipe communicating with said lowermost zone of said container for withdrawing separated dispersed-phase material therefrom.

10. An electric treater as defined in claim 9 in which each of said rods is of a vertical length greater than that of its corresponding tubular cell and provides a lower end extending downward into and terminating in said entrance zone to establish an intense auxiliary electric field in said entrance zone between each such lower end and the upper portion of said body of said separated dispersed-phase material in said lowermost zone of said container, and including means for varying the intensities of said auxiliary fields, said last named means including valve means in said effluent pipe for withdrawing said separated dispersed-phase material for changing the level of said upper portion of said body of separated dispersed-phase material relative to said lower ends of said rods.

References Cited by the Examiner
UNITED STATES PATENTS

| | | | |
|---|---|---|---|
| 1,838,889 | 12/1931 | Van Loenen | 204—302 |
| 1,838,923 | 12/1931 | Fisher | 204—302 |
| 2,029,527 | 2/1936 | Fisher | 204—306 |
| 2,033,137 | 3/1936 | Fisher | 204—188 |
| 2,825,686 | 3/1958 | Greene et al. | 204—302 XR |
| 2,855,356 | 10/1958 | Stenzel | 204—302 |
| 3,121,055 | 2/1964 | Carswell | 204—302 |

WINSTON A. DOUGLAS, *Primary Examiner.*

JOHN R. SPECK, JOHN H. MACK, ALLEN B. CURTIS, *Examiners.*

R. GOOCH, B. J. OHLENDORF, *Assistant Examiners.*